Dec. 13, 1966   A. CORSANO   3,291,156

CLOSURE PLUG

Filed Oct. 17, 1963

INVENTOR.
ALFRED CORSANO
BY
ATTORNEY

United States Patent Office 3,291,156
Patented Dec. 13, 1966

3,291,156
CLOSURE PLUG
Alfred Corsano, Belle Mead, N.J., assignor to Johns-Manville Corporation, New York, N.Y., a corporation of New York
Filed Oct. 17, 1963, Ser. No. 316,911
7 Claims. (Cl. 138—89)

This invention relates to apparatus for forming a fluid tight closure adjacent the end of a conduit and more specifically relates to apparatus for regulating the amount of force which may be applied to the sealing ring in a generally radial direction while effecting a fluid tight seal between a closure plug and the inner surface of a pipe adjacent the end of the pipe. The invention is particularly directed to apparatus for forming a closure plug of the type which is used adjacent the end of an asbestos-cement building sewer pipe.

Whenever a building sewer pipeline is installed for commercial operation, industrial or residential, it is necessary that the pipeline be field tested to insure that the pipeline will meet the required building specifications. In order to test the pipeline, it is necessary to seal an open end thereof so that the necessary fluid pressure for the test may be established in the pipeline. Since the pipe used in the building sewer industry has comparatively thin walls, which are not designed to resist excessively high pressures applied thereto from an internal direction, it is necessary that the closure plugs used effect the seal with a minimum amount of pressure being directed against the inner surface of the pipe. Also, many times during the installation of a pipeline, it is desirable to close open ends of T's and other types of fittings overnight. A closure plug is used then to prevent infiltration of water or other materials into the pipeline.

It is an object of the instant invention to provide apparatus for effecting a fluid tight seal adjacent the end of a conduit and to regulate the amount of force which may be applied in a generally radial direction against the inner wall of the conduit to effect the seal.

The foregoing objects are accomplished in accordance with the instant invention by a closure plug which in the preferred embodiment comprises an annular ring of a resilient material held between a cooperating pair of plates. The closure plug is designed to be placed in the end of a conduit, such as a building sewer pipe, with the outer peripheral surface of the annular ring in slight frictional contact with the inner wall of the conduit. Each of the plates is provided with a conical peripheral surface in contact with the annular ring. The relationship between the smaller diameter of each of the conical surfaces of the plates and the inside diameter of the annular ring is such that when these surfaces are in contact with the annular ring, the adjacent axial extremities of the plates are spaced from each other when the plug has been initially assembled for insertion into the conduit. Means, which in the preferred embodiment of the invention comprises a bolt, nut and washer combination, are provided to move the plates toward each other. As the plates move toward each other, the conical surfaces apply forces outwardly in a generally radial direction on the annular ring to effect a fluid tight seal between the plates and the inner surface of the pipe. The closure plug is further provided with means for automatically regulating the amount of force applied in a generally radial direction on the annular ring even though the relative movement of the plates toward each other is continued. In this manner, the instant invention limits the amount of the radial forces applied against the inner surface of the pipe to effect the necessary fluid tight seal for the testing of the pipeline. Although the invention is defined in relation to an asbestos-cement building sewer pipeline, it is understood that the disclosed closure plug may be used with any type of conduit.

The invention will be more fully understood and further objects and advantages thereof will become apparent when reference is made to the following detailed description of a preferred embodiment of the invention and the accompanying drawing in which.

Figure 1:
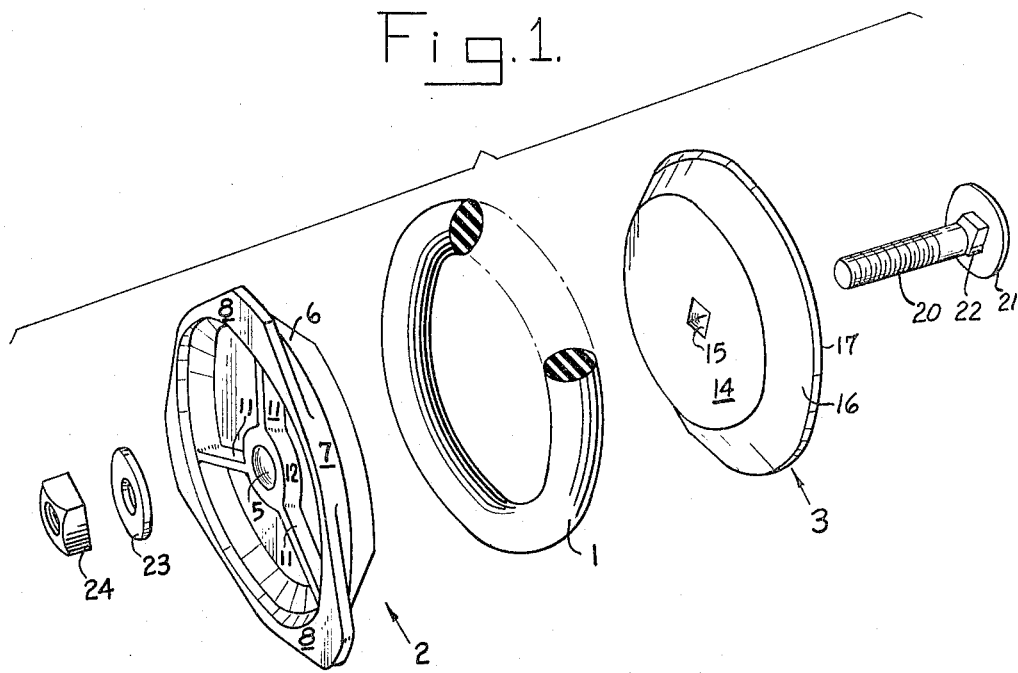
FIG. 1 is an exploded pictorial representation of a closure plug made in accordance with the instant invention.

Referring to the drawing, there is illustrated in FIG. 1 the various components of a closure plug of the instant invention comprising a sealing ring 1 formed from a readily deformable material such as rubber. In the preferred embodiment of the invention, the sealing ring 1 comprises an annular ring having a substantially circular cross-sectional configuration. However, it is to be understood that rings having other cross-sectional configurations may be utilized within the inventive concepts of the instant application. A pair of plates 2 and 3 are provided and as illustrated in FIG. 1 are positioned on either axial extremity of the ring 1.

Figures 2, 3:
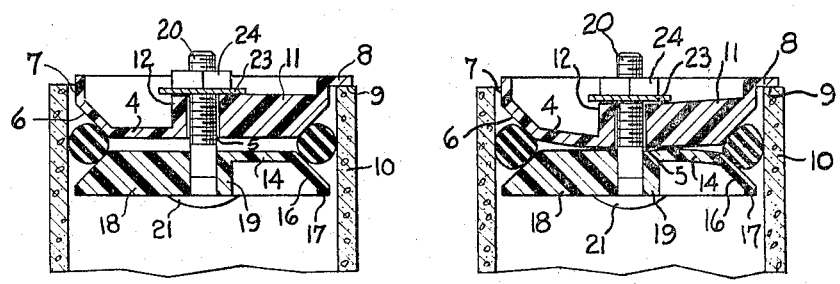
FIG. 2 is a view in cross section of a closure plug immediately after the insertion thereof into a pipe end.
FIG. 3 is a view in cross section of a closure plug in operative sealing position.

The plate 2 comprises a generally circular base 4 having a central cylindrical opening 5 therein. The base 4 lies generally in a plane extending substantially perpendicular to the axis of the opening 5. The peripheral surface of the plate 2 comprises a conical portion 6 integrally joined at its end of smaller diameter to the base 4 and at its other end, of larger diameter, integrally to a generally cylindrical portion 7. A plurality of positioning lugs 8 extend in a radial direction from the generally cylindrical portion 7 and, as illustrated in FIGS. 2 and 3, these lugs 8 contact the axial extremity 9 of the pipe 10 when the closure plug is inserted into the pipe 10. The plate 2 is further provided with a plurality of strengthening ribs 11 which are integral with the base 4 and a central boss 12 which is also integral with the base 4. The opening 5 extends continuously through the base 4 and the boss 12.

The plate 3 comprises a generally circular base 14 having a central opening 15 having a generally rectangular cross-sectional configuration. The base 14 lies generally in a plane extending generally substantially perpendicular to the axis of the opening 15. The peripheral surface of the plate 3 comprises a conical portion 16 integrally joined at its end 10 of smaller diameter to the base 14 and at its other end, of larger diameter, integrally to a generally cylindrical portion 17. The plate 3 is further provided with a plurality of strengthening ribs 18 which are integral with the base 14 and a central boss 19 which is also integral with the base 14. The opening 15 extends continuously through the base 14 and the boss 19. As illustrated in FIG. 1, there is also provided a threaded bolt 20 having an enlarged head 21. Adjacent the head 21, the bolt 20 is provided with a portion 22 having a generally rectangular cross-sectional configuration to cooperate with and be complementarily received in the opening 15. A washer 23 and nut 24 are provided for a purpose to be described.

The operation of the closure plug is best illustrated in FIGS. 2 and 3. The unit is assembled by sandwiching the annular ring 1 between the plates 2 and 3 with the annular ring 1 in contact with the conical portions 6 and 16 of the plates 2 and 3. The bolt 20 is inserted into the opening 15 until the head 21 contacts the boss 19. The threaded portion of the bolt 20 passes through the opening 5 in the plate 2 and the washer 23 and nut 24 are placed thereon. The nut 24 is tightened by hand until the washer 23 contacts the boss 12. The assembled plug is then placed within the open end of the pipe 10 with the lugs 8 in contact with the axial extremities 9 of the pipe 10. After the closure plug has been inserted into the pipe 10, the nut 24 is tightened by any suitable means, such as a wrench (not shown), to move the plates 2 and 3 toward each other. As the plates 2 and 3 are moved toward each other, the conical portions 6 and 16 tend to expand the ring 1. Since the expansion of the ring 1 is limited by the inner surface of the pipe 10, the ring 1 is deformed by the pressures exerted thereon by the movement of the plates 2 and 3 so as to provide an effective seal between the inner surface of the pipe 10 and the conical portions 16 and 6 of the plates 3 and 2. As illustrated in FIG. 1, the surfaces of the ring 1 adjacent the inner surface of the pipe 10 in the conical portions 16 and 6 of the plates 3 and 2 have been flattened. The rectangular cross-sectional shape of the bolt 20 and the opening 16 prevents the bolt 20 from turning as the nut 24 is tightened due to the frictional forces between the plate 3, the ring 1 and the inner surface of the pipe 10.

As stated above, one of the uses for the instant invention is in the testing of building sewer pipelines. The asbestos-cement pipe used for this type of surface has physical characteristics which limit the amount of force which may be applied in a generally radial direction against the inner wall of the pipe. In the instant invention, means are provided to prevent the exertion of too great a force in a generally radial direction against the inner surface of the pipe 10. In the preferred embodiment of the invention, the plates 2 and 3 are made from a plastic or other similar type of material which together with the ribs 11 and 18 allows resistive flexing of the bases 4 and 14. As illustrated in FIG. 3, the plates 2 and 3 will move toward each other and thus deform the resilient annular ring 1 only until a certain amount of force is being transmitted to the ring 1 in a generally radial direction. At this point, the bases 4 and 14 of each plate will resistively flex and begin to move toward each other. After this point has been reached, further tightening of the nut 24 only moves the flexed portions of the bases 4 and 14 toward each other without increasing or decreasing the amount of force being applied to the annular ring 1 in a generally radial direction. In the preferred embodiment of the invention, each of the bases 4 and 14 flex toward each other. However, within the scope of the instant invention, the plates 2 and 3 may be designed so that only one base 4 or 14 will flex to give the desired result.

The various parameters involved in preventing an excessive amount of force being applied in a generally radial direction against the inner surface of the pipe is dependent upon many factors including the size of the pipe, the thickness and cross-sectional configuration of the ring, the durometer of the ring, the taper and diameter of the conical portions 6 and 16 and other like characteristics. In one embodiment of the invention, an operative closure plug for an asbestos-cement building sewer pipe having a 4 inch inside diameter comprised a a pair of plates 2 and 3 made from a plastic material such as acrylonitrile butadiene styrene. The diameter of each of the bases 4 and 14 was approximately 2.80 inches and the conical portions 6 and 16 extended therefrom at an angle of approximately 45°. The maximum diameter of the cylindrical portions 7 and 17 was approximately 3.75 inches. Each base 4 and 14 had a thickness in an axial direction of approximately 5/32 of an inch except at the ribs 11 and 18 wherein the thickness in an axial direction was approximately 9/16 of an inch. Each boss 12 and 19 had a diameter of approximately 7/8 of an inch and the central opening 5 had a diameter of approximately 3/8 of an inch. The opening 15 was square in cross-sectional configuration with each side being approximately 3/8 of an inch. The annular ring 1 had an outside diameter of 3.94 inches and was generally circular in cross-sectional configuration with a diameter of 0.55 in. The ring comprises a natural rubber having a durometer of about 55. The bolt 20 was two inches in length with a diameter of about 3/8 of an inch. The head 21 had a diameter of about 15/16 of an inch and the washer 23 an outside diameter of about one inch. The portion 22 of the bolt 20 is designed to be received snugly within the opening 15 to effect a fluid tight seal between the portion 22 and the opening 15. In some instances, it may be desirable to insert a suitable gasket (not shown) between the head 21 and the boss 19 to insure a fluid tight seal between the bolt 20 and the boss 19. This closure plug was inserted into the end of an asbestos-cement building sewer pipe and the ring was expanded into sealing relationship by the tightening of the nut 24. The pipeline was then filled with water and tested at the test pressure of 25 foot head of water. The closure plug operates to prevent leakage of the water from the pipeline. It is understood that the foregoing dimensions are given for illustration purposes only and that the invention is not to be limited thereto.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. A closure plug for conduits comprising:
 (a) an annular ring comprising a resilient material;
 (b) means for mounting said ring adjacent the inner surface of a conduit;
 (c) at least a portion of said mounting means comprising a resistively flexible material;
 (d) means for applying a force in a generally radial direction to said ring to deform said ring into a sealing relationship between said inner surface of said conduit and said mounting means; and
 (e) means comprising the resistive flexing of at least a portion of said mounting means for limiting the amount of force applied in a generally radial direction by said force applying means to prevent injury to said conduit even though portions of said mounting means may continue to be operated by said force applying means.

2. A closure plug for conduits comprising:
 (a) an annular ring comprising a resilient material;
 (b) a pair of cooperating plates for mounting said rings adjacent the inner surface of a conduit;
 (c) at least one of said plates comprising a resistively flexible material and having at least a portion of its external periphery defined by a generally conical surface;
 (d) said ring being positioned between said plates and in contact with said conical surface adjacent the portion having the smaller outside diameter;
 (e) means for applying a force to said plates to cause relative movement between said plates to apply pressure to said ring through said conical surface so as to deform said ring into a sealing relationship between said plates and the inner surface of said conduit; and
 (f) means comprising the resistive flexing of at least one of said plates for limiting the amount of pressure applied in a generally radial direction by said force applying means to prevent injury to said conduit even though portions of said plates may continue their relative movement in response to a continued application of said force.

3. A closure plug for conduits comprising:
 (a) an annular ring comprising a resilient material;
 (b) a pair of cooperating plates for mounting said rings adjacent the inner surface of a conduit;

(c) each of said plates comprising a resistively flexible material and having at least a portion of its external periphery defined by a generally conical surface;
(d) said ring being positioned between said plates and in contact with said conical surfaces adjacent the portions having the smaller outside diameter;
(e) means for applying a force to said plates to cause relative movement between said plates to apply pressure to said ring through said conical surfaces so as to deform said ring into a sealing relationship between said plates and the inner surface of said conduit; and
(f) means comprising the resistive flexing of at least one of said plates for limiting the amount of pressure applied in a generally radial direction by said force applying means to prevent injury to said conduit even though portions of said plates may continue their relative movement in response to a continued application of said force.

4. A closure plug for conduits comprising:
(a) an annular ring comprising a resilient material;
(b) a pair of cooperating plates for mounting said rings adjacent the inner surface of a conduit;
(c) each of said plates comprising a resistively flexible material and having at least a portion of its external periphery defined by a generally conical surface;
(d) said ring being positioned between said plates and in contact with said conical surfaces adjacent the portions having the smaller outside diameter;
(e) means for applying a force to said plates to cause relative movement between said plates to apply pressure to said ring through said conical surfaces so as to deform said ring into a sealing relationship between said plates and the inner surface of said conduit; and
(f) means comprising the resistive flexing of each of said plates for limiting the amount of pressure applied in a generally radial direction by said first applying means to prevent injury to said conduit even though portions of said plates may continue their relative movement in response to a continued application of said force.

5. A closure plug for conduits comprising:
(a) a conduit having a generally cylindrical inner surface;
(b) an annular ring comprising a resilient material;
(c) a pair of cooperating plates for mounting said rings adjacent the inner surface of said conduit;
(d) each of said plates comprising a resistively flexible material and having surfaces facing each other;
(e) each of said surfaces lying in a plane extending in generally perpendicular to the longitudinal axis of said conduit;
(f) at least one of said plates having at least a portion of its external periphery defined by a generally conical surface;
(g) said ring being positioned between said plates and in contact with said conical surface adjacent the portion having the smaller outside diameter;
(h) means for applying a force to said plates to cause relative movement between said plates to apply pressure to said ring through said conical surface so as to deform said ring into a sealing relationship between said plates and the inner surface of said conduit; and
(i) means comprising the resistive flexing of at least one of said plates for limiting the amount of pressure applied in a generally radial direction by said force applying means to prevent injury to said conduit even though portions of said plates may continue their relative movement in response to a continued application of said force.

6. A closure plug for conduits comprising:
(a) a conduit having a generally cylindrical inner surface;
(b) an annular ring comprising a resilient material;
(c) a pair of cooperating plates for mounting said rings adjacent the inner surface of a conduit;
(d) each of said plates comprising a resistively flexible material and having surfaces facing each other;
(e) each of said surfaces lying in a plane extending generally perpendicular to the longitudinal axis of said pipe;
(f) each of said plates having at least a portion of its external periphery defined by a generally conical surface;
(g) said ring being positioned between said plates and in contact with said conical surfaces adjacent the portions thereof having a smaller outside diameter;
(h) means for applying a force to said plates to cause relative movement between said plates to apply pressure to said ring through said conical surfaces so as to deform said ring into a sealing relationship between said plates and said inner surface of said conduit; and
(i) means comprising the resistive flexing of at least one of said plates for limiting the amount of pressure applied in a generally radial direction by said pressure applying means to prevent injury to said conduit even though portions of said plates may continue their relative movement in response to a continued application of said force.

7. A closure plug for conduits comprising:
(a) a conduit having a generally cylindrical inner surface;
(b) an annular ring comprising a resilient material;
(c) a pair of cooperating plates for mounting said rings adjacent the inner surface of a conduit;
(d) each of said plates comprising a resistively flexible material and having surfaces facing each other;
(e) each of said surfaces lying in a plane extending generally perpendicular to the longitudinal axis of said pipe;
(f) each of said plates having at least a portion of its external periphery defined by a generally conical surface;
(g) said ring being positioned between said plates and in contact with said conical surfaces adjacent the portions thereof having a smaller outside diameter;
(h) means for applying a force to said plates to cause relative movement between said plates to apply pressure to said ring through said conical surfaces so as to deform said ring into a sealing relationship between said plates and said inner surface of said conduit; and
(i) means comprising the resistive flexing of each of said plates for limiting the amount of pressure applied in a generally radial direction by said pressure applying means to prevent injury to said conduit even though portions of said plates may continue their relative movement in response to a continued application of said force.

References Cited by the Examiner

UNITED STATES PATENTS

| | | | |
|---|---|---|---|
| 2,155,491 | 4/1939 | Jacobs | 138—89 |
| 2,720,893 | 10/1955 | Foreman | 138—89 |
| 2,764,184 | 9/1956 | Fitzhugh et al. | 138—89 |
| 3,172,670 | 3/1965 | Pras | 277—188 X |

LAVERNE D. GEIGER, *Primary Examiner.*

T. L. MOOREHEAD, *Assistant Examiner.*